April 20, 1965 S. GUENNOU 3,179,874
ELECTRONIC REGULATING DEVICE
Filed May 11, 1961 3 Sheets-Sheet 1

INVENTOR
SERGE GUENNOU
BY Frank R. Trifari
AGENT

INVENTOR
SERGE GUENNOU
BY Frank R. Jeifani
AGENT

INVENTOR
SERGE GUENNOU
BY
AGENT

United States Patent Office 3,179,874
Patented Apr. 20, 1965

3,179,874
ELECTRONIC REGULATING DEVICE
Serge Guennou, Paris, France, assignor to North American Philips Company, Inc., New York, N.Y., a corporation of Delaware
Filed May 11, 1961, Ser. No. 109,332
Claims priority, application France, June 16, 1960, 830,211
10 Claims. (Cl. 322—25)

The invention relates to an electronic regulating and switching device for regulating the voltage across a load supplied by a source of electric energy, and in particular for regulating an electric generator by controlling the energizing circuit thereof. Devices of this kind are known which comprise an electronic switch connected in a circuit of the source of electric energy, an amplifier for controlling this switch, and a voltage comparison circuit supplied with the voltage across the load and producing a difference voltage which is applied to the input of the amplifier. It is also known to use a transistor as the amplifying element of at least the last stage of the amplifier, and to use a power transistor controlled by this transistor as the electronic switch.

It is an object of the invention to provide a device of this kind which is capable of regulating and/or switching the power supplied by a source of electric energy to a load and in which the power to be switched is large compared with the maximum permissible dissipation in the power transistor.

The device according to the present invention is characterized in that a feedback circuit is provided between the output electrode of the power transistor and the control electrode of the amplifying transistor, whereby these two transistors together constitute a trigger circuit, so that in accordance with the value of the voltage applied to the input of the amplifier the main current path of the power transistor is either cut off or so highly conductive that the voltage drop across this main current path is very small. In other words, this feedback circuit ensures that the power transistor operates as a circuit breaker and hence is capable of regulating the voltage across a load consuming a comparatively large amount of electric energy.

The device according to the invention is particularly suited for regulating an electric generator, either an alternating-current generator or a direct-current generator, for example, a generator of the kind generally used in vehicles, such as railway or motor vehicles, and in aircraft. In these and other applications, special embodiments of the device according to the invention may also serve as the usually required current limiters and/or as circuit breakers. As a typical example, the use of a device according to the invention for regulating the generator of a motor vehicle will be described more fully hereinafter, in which application this device may replace the known usual mechanical regulators and circuit breakers with vibrating contacts. The electronic device according to the invention offers several advantages over these mechanical regulators, for example, far smaller dimensions and weight, far higher speed of response and, owing to the absence of any mechanical contacts and of any moving component, a far longer life. When the device according to the invention is used for regulating a generator in an aircraft, it provides the further advantage of smaller sensitivity to mechanical vibrations and/or abrupt accelerations.

In order to satisfy the requirements for regulating mechanically driven electric generators, for example, generators driven by internal combustion engines, any mechanical or electronic regulating and switching device has to be capable of maintaining constant the voltage supplied by the generator, irrespective of the speed and the load of this generator. In addition, this device has to be capable of disconnecting the generator from the load, when the latter tends to consume too large a current which is likely to damage the load or the generator.

The above-mentioned specific embodiments of the device according to the invention are particularly suitable to satisfy these two requirements.

In order that the invention may readily be carried into effect, embodiments thereof will now be described by way of example, with reference to the accompanying diagrammatic drawings, in which.

Figure 1:
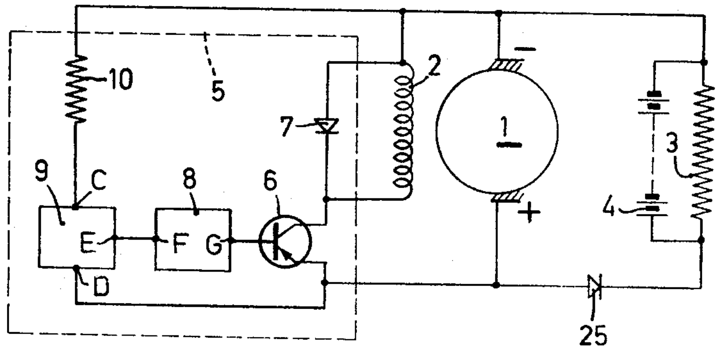
FIG. 1 is a schematic diagram of a regulating device according to the invention.
Figure 2:
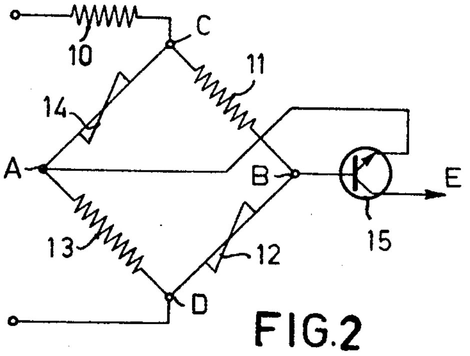
FIG. 2 is a simplified circuit diagram of the reference voltage generator or voltage comparison circuit followed by an amplifier.
Figure 3:
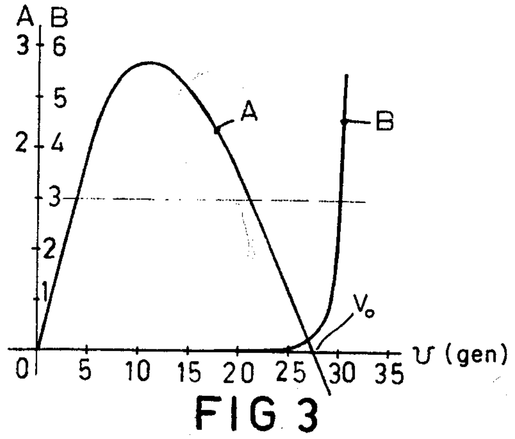
FIG. 3 shows two curves illustrating the operation of the device shown in FIG. 2.

In FIG. 1, a direct-current generator 1 is energized by a winding 2 and supplies a load network 3 comprising a buffer battery 4 which is charged by this generator. The device according to the invention is shown schematically within a frame 5 made up of broken lines and comprises an electronic switch for the energizing circuit consisting of a PNP type power transistor 6 which is connected in series with the winding 2 and can only be in either of two conditions, a cut-off condition and a saturation condition, according to the value of the voltage supplied to its control electrode. The device further includes a unilaterally conductive element 7, which is connected in parallel with the said winding and the operation of which will be described more fully hereinafter. The control electrode of the transistor 6 is connected to the output circuit of a transistor intermediate amplifier 8, to which an input voltage is supplied from a voltage comparison circuit 9 including a third transistor. This comparison circuit is connected in series with a resistor 10, the series combination 9–10 being supplied by the generator. The comparison circuit 9 comprises a combination of normal (that is to say, substantially fixed) ohmic resistors and of conducting elements having non-linear characteristics, which together are connected to form a Wheatstone bridge. In FIG. 2, this bridge is shown including ohmic resistors 11 and 13 in two opposite arms and, in the two other arms, resistors 12 and 14 having non-linear characteristics of the known so-called VDR kind, the value of which increases as the current increases. FIG. 2 shows that the total current flowing through this bridge, which is fed at the junctions C and D, on the one hand through the arms 11 and 12 and on the other hand through the arms 14 and 13, produces between the junctions A and B a potential difference $V_{AB}$ which depends in a non-linear manner from the said current, that is to say, ultimately from the voltage $U(gen)$ applied across the diagonal CD by the generator. This potential difference $V_{AB}$ is shown in FIG. 3 by a curve A (ordinates) as a function of the voltage $U(gen)$ (abscissae). The curve A shows that the function $V_{AB}=fU(gen)$ has a maximum at a value of $U(gen)$ of about one third of the interval $0-V_0$, where $V_0$ is the abscissa of the point $V_{AB}=0$ of the curve A and hence corresponds to the balanced condition of the bridge.

The voltage $V_0$, which is thus unambiguously determined, is used as a reference voltage. It should be noted that, on the one hand, owing to the non-linear nature of the elements 12 and 14, the Wheatstone bridge of FIG. 2 can only be balanced by varying the supply voltage, and that, on the other hand, the voltage $V_{AB}$ between the junctions A and B, which is positive for $V_{AB}<V_0$, becomes negative for $V_{AB}>V_0$, so that a transistor, in particular a transistor of the type OC139, can be controlled thereby.

According to the invention, this voltage is applied to the control electrode of a transistor 15 of the type which is base-controlled so that it remains cut-off as long as $V_{AB}$ remains positive, that is to say, as long as the voltage $U(gen)$ is smaller than the reference voltage $V_0$. However, if this value is reached, $V_{AB}$ becomes zero and the transistor 15 abruptly passes to the saturation condition. The collector current $i_c$ plotted as the ordinate varies according to curve B of FIG. 3. It should be noted that, due to the fact that this transistor is saturated even at a control current of 1.5 ma., a variation of the generator voltage of less than 1 volt in the proximity of the reference voltage suffices to flip over the amplifier constituted by this transistor. The fact that this amplifier is rendered conductive causes the power transistor 6 connected in the energizing circuit as an electronic switch to be cut off and hence breaks the energizing circuit of the generator. However, instead of directly connecting the control electrode (in the case under consideration, the base) of the transistor 6 to the output electrode of the transistor 15, and because the device in accordance with the invention may also contain a current limiting transistor 8, it is of advantage to use this latter transistor as an intermediate amplifier.

Figure 4:
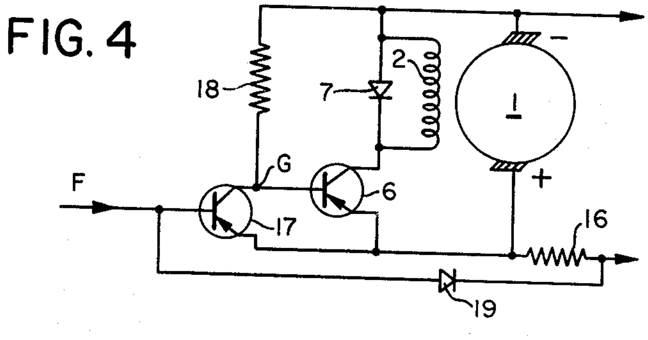
FIG. 4 is a simplified circuit diagram of a current limiter according to the invention.

FIG. 4 shows a schematic circuit diagram of this limiter. It comprises a resistor 16 connected in series with the load network of the generator and a PNP type transistor 17 with its load resistor 18, which are supplied with the voltage at the terminals of the generator. The value of the resistor 16 has to be so small as to produce no excessive voltage drop (for example, this voltage has to be less than 1 volt with a current of at least 10 a. or 15 a.) but it should suffice to control the transistor 17. For this purpose, the output terminal of this resistor is connected to the control electrode (in the embodiment shown, the base) of this transistor through a unilaterally conductive element, in the case shown a diode 19.

In practice, the resistor 16 is preferably connected in one of the arms of the bridge used as the voltage comparison circuit 9 (FIG. 1) to produce the reference voltage $V_0$.

Figure 5:
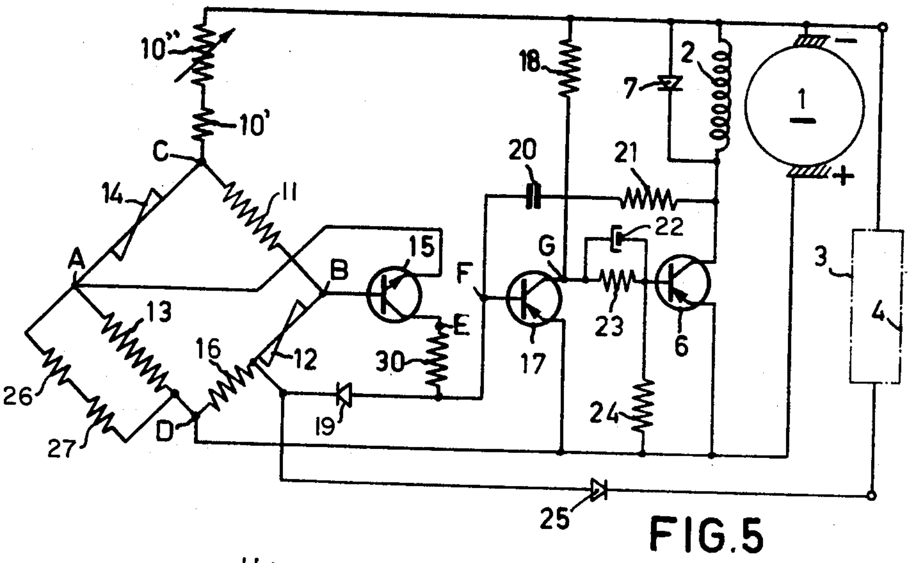
FIG. 5 is a more detailed circuit diagram of an electronic regulating, limiting and switching device according to the invention.

An elaborate embodiment of an electronic regulating, limiting and switching device according to the invention, for use in combination with a direct-current generator 1, supplying a load network including a buffer battery, is shown in greater detail in FIG. 5. In this figure, the resistor 16 is connected in series with the load network, in the arm BD of the Wheatstone bridge, in which arm it is connected in series with the VDR resistor 12. A capacitor 20 connected in series with a resistor 21 connects the base of the PNP type transistor 17 to the collector of the power transistor 6 which operates as a switch controlling the energizing winding 2. This connection is used to provide positive feedback to the intermediate amplifier 17, so as to increase the amplification thereof, so that it can only be either in the saturated condition or in the cut-off condition.

An RC circuit comprising the parallel combination of a capacitor 22 and a resistor 23 interconnects the collector of the transistor 17 and the base of the transistor 6 and, due to its time constant, improves the rise time of the latter transistor.

The resistor 18 serves as a load for the collector of the transistor 17 when this transistor is conductive, or as a supply lead for the base of the transistor 6 when the transistor 17 is cut off. Thus, the rest potential of the collector of the transistor 17 is always substantially equal to the potential of the base and emitter of the transistor 6. It should be noted that the current through the resistor 18 alternately flows through the collector of the transistor 17 and through the base of the transistor 6, so that the potential of point G is always very low (from −0.6 volt to −1.5 volt).

Finally, the ohmic resistor 10 of FIGS. 1 and 2, which is connected in series with the voltage comparison circuit producing the reference voltage, is replaced by the series combination of two resistors 10′ and 10″, the latter of which is variable. The assembly comprising the Wheatstone bridge, together with these resistors constitutes a potentiometer, which is connected to the terminals of the generator and which, at least when the bridge is balanced (or substantially balanced), enables a given ratio to be maintained between the voltage $U(gen)$ supplied by the generator and the voltage applied to the junctions C and D of the bridge. The ratio is controlled by varying the value of the resistor 10″.

The role of the unilaterally conductive element shunting the energizing winding and which, in the embodiment described, is a diode 7, will now be described. This diode is used for two purposes; firstly, it permits of avoiding any momentary voltage increase between the electrodes of the transistor 6 which might be caused by a sudden decrease of the current, due to this transistor being cut off, because, in the conductive condition, the voltage drop across the terminals of this diode remains less than 0.7 volt.

Secondly, it enables the current in the transistor and in the inductance to be abruptly restored after a short interruption, since the induction current in the circuit comprising the inductance and the diode persists for a certain period of time. This time depends upon the inductance and its internal resistance. Hence, the transistor 6, the collector potential of which alternately is 0.6 volt and 28.5 volt, can operate as a trigger. This voltage variation is utilized by the feedback loop (resistor 21, capacitor 20) which transmits this variation to the base of transistor 17 in a direction promoting the control of the transistor 6 as a make- and breakswitch.

As an example, and in order to fix ideas, the values of the various elements of the embodiment of the circuit arrangement shown in FIG. 5, are given hereinafter. This figure shows a regulating, limiting and switching device intended for co-operation with a generator which, when loaded, is capable of delivering a maximum current of 15 amperes at a stabilized voltage of 28.5 volts (±0.5 volt).

*Transistors*

| | Type |
|---|---|
| 6 | OC 16 |
| 15 | OC 139 |
| 17 | OC 72 |

*Diodes*

| | |
|---|---|
| 7 | OA 210 |
| 19 | OA 73 |
| 25 | OA 250 |

*Resistors of fixed value*

| | Ohms |
|---|---|
| 10′ | 50 |
| 10″ | 50 |
| 11 | 110 |
| 13 | 110 |
| 16 | 0.025 |
| 18 | 240 |
| 21 | 100 |
| 23 | 10 |
| 24 | 390 |
| 30 | 390 |

*Capacitors*

| | /μf. |
|---|---|
| 20 | 0.25 |
| 22 | 50 |

*Current dependent resistors*

| | |
|---|---|
| 12 | E 29 DE/F 116 |
| 14 | E 29 DE/F 116 |

The connection of the generator to its load network comprising a battery is established by a power diode 25 of the type OA 250 which is connected so as to pass current only in the direction from the generator to the network and to prevent the passage of current from the battery to the generator. Thus, this diode replaces the mechanical switch with vibrating contacts generally used in motor vehicles. A rest bias voltage may be applied to this diode so that it becomes conductive only beyond a minimum value of the generator voltage.

Figure 6:
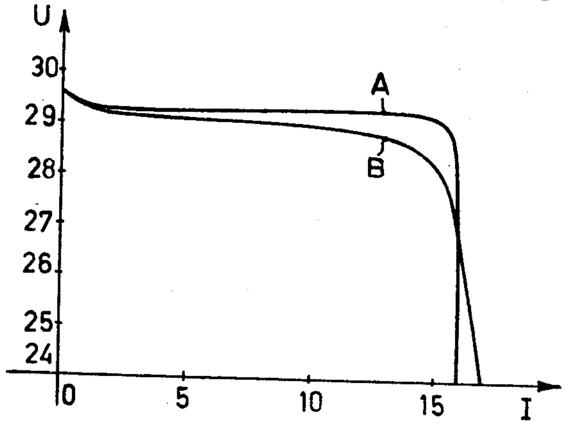
FIG. 6 shows two curves illustrating the properties of the device according to the invention.

FIG. 6 shows, by way of example, on curve A the operating characteristic of a device according to the invention of the kind shown in FIG. 5, while curve B is a similar characteristic of a conventional mechanical regulator for co-operation with the same generator. The output current of the generator is plotted as the abscissae and its terminal voltage as the ordinates. A comparison of these curves is completely in favor of the regulating, limiting and switching device of the electronic type.

The resistors 12 and 14 (FIG. 5), the values of which depend upon the value of the current and which lie in opposite arms of the Wheatstone bridge, have the disadvantage of being slightly sensitive to temperature variations. The temperature under the hood of a motor vehicle may normally show large fluctuations and these fluctuations may interfere with the operation of the above-described device. Consequently, it may be required for this device to be provided with compensating elements capable of maintaining its operating conditions substantially equal to those at a constant temperature of, say, 25° C. For this purpose, the bridge shown in FIG. 5 is supplemented by at least one resistor having a negative temperature coefficient (a so-called NTC resistor). In the case under consideration, an NTC resistor 26 in series with an ohmic resistor 27 is connected in parallel with the ohmic resistor 13 in the arm DA of the bridge. The NTC resistor is chosen so that the time constant relative to its temperature increase is of the same order of magnitude as the time constant of the VDR resistors 12 and 14. If, for example, it is desired to utilize a device, the various components of which have the values given hereinbefore, the resistor 13 of 110 ohms is replaced by a resistor of 210 ohms shunted by the series combination of a NTC resistor 26 of the type B8 320 09 P/150 E and of an ohmic resistor 27 of 180 ohms. These characteristics are chosen to impart to the arm DA of the bridge a temperature coefficient which compensates as accurately as possible for the influence exerted by the temperature on the two VDR resistors 12 and 14.

It should further be pointed out that the device shown in FIG. 5, which is intended for co-operation with a certain type of generator, would have to be modified in order to match it to another type of generator. However, this also applies to the conventional mechanical devices. For example, if the device described, which is intended for co-operation with a generator of 28.5 volts and 15 amperes, had to be used with a generator of 34 volts and 12 amperes, that is to say a generator of a power of the same order of magnitude, the following modifications should preferably be made:

(*a*) Replacement of the power-transistor 6 of the type OC 16 operating as a switch by a transistor of the type OC 28;

(*b*) Connection of an ohmic resistor of 390 ohms in the collector circuit of the transistor 15 to limit the energy dissipation in this element;

(*c*) A choice of the current of the current-dependent resistors (VDR resistors) 12 and 14 in the Wheatstone bridge such that the resistors 10' and 10'' connected in series with this bridge can be omitted, in order to avoid the characteristic of the voltage as a function of the output current should rise again.

Figure 7:
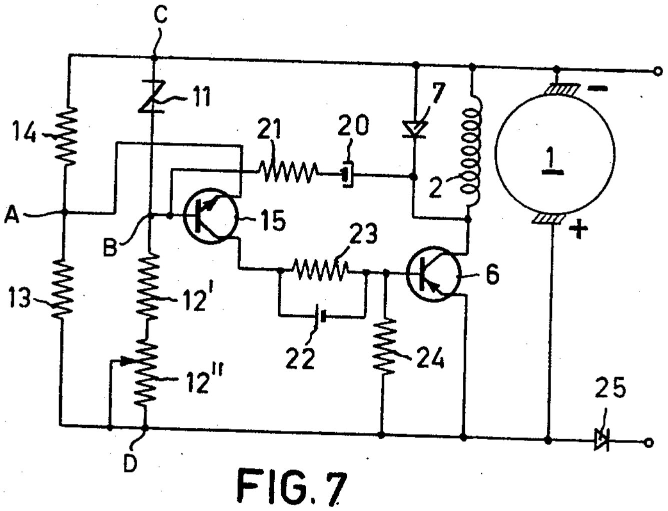
FIG. 7 is a circuit diagram similar to the circuit diagram of FIG. 5 but showing a simplified and more economical embodiment of the device shown in the said figure.

In other cases, in which no current limitation is required, a simple device consuming less power may be used, and the circuit diagram of such a device is shown in FIG. 7. Similar elements are designated by the same reference numerals as in FIG. 5. It will be noted that the transistor 17 and the resistor 16, which provided the current limitation, are omitted, as are the resistors connected in series with the Wheatstone bridge. The arm CB of the bridge now comprises a single VDR resistor 11 replacing the former ohmic resistor 11. The resistors 13 and 14 both are fixed resistors (each having a value of 68 ohms), while the former VDR resistor 12 in the arm BD is replaced by the series combination of two ohmic resistors, of which one, 12', is fixed and has a value of 56 ohms and the other, 12'', is variable between 0 ohm and 160 ohms.

The feedback loop comprising the resistor 21 and the capacitor 20 remains unchanged. Both in FIG. 5 and in FIG. 7, this loop, which connects the collector of the power transistor 6 to the base of the preceding transistor (the base of the transistor 17 in FIG. 5 and the base of the transistor 15 in FIG. 7), maintains this base at a rest potential substantially equal to the base and emitter potentials of the transistor 6, so that this transistor operates as a trigger.

Obviously, the embodiments described may be modified, in particular by substitution of equivalent technical means, without departing from the scope of the invention.

In particular, it will be appreciated that the devices described may readily be adapted to cooperate with an alternating current generator. It is then sufficient to modify the current limiter in accordance with the circuit of FIG. 4, whereby it is immaterial whether the resistor 16 is traversed by direct current or by alternating current, since a single polarity of the voltage drop across this resistor is transmitted to the control electrode of the transistor 17, by means of the diode 19, and also to connect a diode between the generator and its energizing circuit on the one hand and the regulator on the other hand, the diode 25 connected between the generator and its loading circuit being omitted.

What is claimed is:

1. A regulating system for a source of electric energy having an energizing circuit and a pair of output terminals for supplying current to a load circuit, comprising a semiconductor device having control and output electrodes, means connecting said semiconductor and said energizing circuit in series across said output terminals, an electron discharge device having a control electrode and an output electrode, means connecting said electron discharge device output electrode to said control electrode of said semiconductor, a voltage comparison circuit connected across said output terminals for producing a control voltage, means for applying said control voltage directly to the control electrode of said electron discharge device for controlling the conduction thereof, a feedback circuit connected between the output and control electrodes of said semiconductor and electron discharge devices, respectively, thereby forming a trigger circuit, a resistor connected in series with said source of electric energy and said load circuit, a gate element connected in circuit with the control electrode of said electron discharge device, and means for applying the voltage developed across said resistor to said gate element, said latter voltage operating to control conduction of said electron discharge device whenever the load current exceeds a predetermined value.

2. A regulating system for a source of electric energy having an energizing circuit and a pair of output terminals and adapted to supply current to a load circuit, comprising a first semiconductor device having control and output electrodes, means connecting said semiconductor and said energizing circuit in series across said output terminals, a second semiconductor device having a control electrode and an output electrode, means connecting said second semiconductor output electrode to said control electrode of said first semiconductor for controlling conduction of said first semiconductor, a voltage comparison circuit connected across said output terminals for producing a bipolar control voltage, means for applying said control voltage to the control electrode of said second semiconductor for controlling the conduction thereof, a feedback circuit connected between the output and control electrodes of said first and second semiconductors, respectively, thereby forming a trigger circuit, a resistor connected in series with said source of electric energy and said load circuit, a gate diode connected in circuit with the control electrode of said second semiconductor, and means for applying the voltage developed across said resistor to said gate diode, said latter voltage operating to control the conduction of said trigger circuit whereby said first semiconductor is cut off whenever the load current exceeds a predetermined value.

3. A regulating system for a source of electric energy having an energizing circuit and a pair of output terminals and adapted to supply current to a load circuit, comprising a first semiconductor device having emitter, base and collector electrodes, means connecting the emitter-collector path of said semiconductor and said energizing circuit in series across said output terminals, a second semiconductor device having a control electrode and an output electrode, means connecting said output electrode to said base of said first semiconductor for controlling conduction of said first semiconductor, a bridge circuit comprising a first pair of diagonal terminals connected across said output terminals and including a voltage-dependent resistor in at least one arm thereof and a second pair of diagonal terminals across which a control voltage is developed, a resistor connected in a bridge arm including a voltage-dependent resistor and connected in series with said source of electric energy and said load circuit, means for applying said control voltage and the voltage developed across said resistor to the control electrode of said second semiconductor for controlling the conduction thereof, a feedback circuit connected between the collector and control electrodes of said first and second semiconductors, respectively, thereby forming a trigger circuit, said voltage developed across said resistor operating to control conduction of said second semiconductor whereby said first semiconductor is rendered substantially non-conductive whenever the load current exceeds a predetermined value.

4. A regulating system for a source of electric energy having an energizing circuit and a pair of output terminals and adapted to supply current to a load circuit comprising a first transistor having emitter, base and collector electrodes, means connecting the emitter-collector path of said transistor and said energizing circuit in series across said output terminals, a second transistor having a control electrode and an output electrode, means connecting said output electrode to said base of said first transistor for controlling conduction of said first transistor, a bridge circuit comprising a first pair of diagonal terminals connected across said output terminals and including a voltage-dependent resistor in at least one arm thereof and a second pair of diagonal terminals across which a control voltage is developed, a resistor connected in a bridge arm including a voltage-dependent resistor and connected in series with said source of electric energy and said load circuit, means for applying said control voltage to the control electrode of said second transistor, a feedback circuit connected between the collector and control electrodes of said first and second transistors, respectively, thereby forming a trigger circuit of said first and second transistors, a gate element connected in circuit with the control electrode of said second transistor, means for applying the voltage developed across said resistor to said gate element, said latter voltage operating to control conduction of said second transistor whereby said first transistor is rendered substantially non-conductive whenever the load current exceeds a predetermined value.

5. Apparatus as described in claim 4, wherein said first transistor has two stable states, either substantially cutoff or substantially saturated.

6. Apparatus as described in claim 4, wherein said feedback circuit comprises the series combination of a capacitor and resistor.

7. A regulating system for a source of electric energy having an energizing circuit and a pair of output terminals for supplying current to a load circuit, comprising a first semiconductor device having control and output electrodes, means connecting said semiconductor device and said energizing circuit in series across said output terminals, a second semiconductor device having a control electrode and an output electrode, means connecting said second semiconductor output electrode to said control electrode of said first semiconductor for controlling conduction of said first semicondutor, a feedback circuit connected between the output and control electrodes of said first and second semiconductors, respectively, thereby forming a trigger circuit, a bridge circuit connected across said output terminals and comprising a pair of diagonal terminals across which a control voltage is developed which varies with the magnitude of the output voltage of said energy source, said bridge circuit comprising a nonlinear voltage dependent resistor in at least one arm thereof which exhibits a variation in resistance value with a variation in the voltage applied thereto such that the voltage appearing across said resistor continuously varies with the variation in said applied voltage, and means for applying said control voltage to the control electrode of said second semiconductor for controlling the conduction of said trigger circuit.

8. Apparatus as described in claim 7 wherein said bridge circuit cmprises first and second ones of said nonlinear voltage dependent resistors connected in opposite arms of said bridge circuit.

9. Apparatus as described in claim 8 further comprising an impedance element connected in series with said energy source and said load circuit for developing a voltage dependent upon the magnitude of the load current, a gate element connected in circuit with the control electrode of said second semiconductor device, and means for applying the voltage developed across said impedance element to said gate element thereby to control the conduction of said trigger circuit whenever the load current varies beyond a predetermined value.

10. Apparatus as described in claim 9 wherein said impedance element is connected in an arm of said bridge circuit which includes said voltage dependent resistor.

References Cited by the Examiner

UNITED STATES PATENTS

| | | |
|---|---|---|
| 2,751,549 | 6/56 | Chase. |
| 2,890,404 | 6/59 | Cronin. |
| 2,892,143 | 6/59 | Sommer. |
| 2,980,843 | 4/61 | Conger et al. |
| 3,022,455 | 2/62 | Hetzler et al. |

RALPH D. BLAKESLEE, *Acting Primary Examiner.*

LLOYD McCOLLUM, *Examiner.*